(12) United States Patent
Hughes et al.

(10) Patent No.: US 8,226,876 B1
(45) Date of Patent: Jul. 24, 2012

(54) SOLID STATE EXTRUSION OF SEMI-CRYSTALLINE FLUORO-POLYMER FILMS

(75) Inventors: O. Richard Hughes, Chatham, NJ (US); Alfred R. Austen, Allentown, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1499 days.

(21) Appl. No.: 11/434,575

(22) Filed: May 9, 2006

(51) Int. Cl.
*C08J 5/00* (2006.01)

(52) U.S. Cl. .......... 264/331.14; 264/104; 264/105; 264/507; 264/663; 264/3.3; 264/514; 264/1.34; 264/319; 264/320; 526/242; 526/243; 526/244; 526/245; 526/247; 526/248; 526/249; 526/250; 526/252; 526/253; 526/254; 526/255

(58) Field of Classification Search .......... 264/331.14, 264/3.3, 514, 634, 635, 104, 105, 507, 663, 264/1.34, 319–320; 526/242–245, 247–250, 526/252–255

See application file for complete search history.

(56) References Cited

U.S. PATENT DOCUMENTS

| | | | | |
|---|---|---|---|---|
| 4,282,277 | A * | 8/1981 | Austen et al. | 428/36.4 |
| 4,508,668 | A * | 4/1985 | Broussoux et al. | 264/435 |
| 4,808,352 | A * | 2/1989 | Bhateja | 264/435 |
| 5,042,924 | A * | 8/1991 | Terasaki et al. | 359/489.07 |
| 6,399,946 | B1 * | 6/2002 | Hobbs | 250/338.2 |
| 2002/0177664 | A1 * | 11/2002 | Albano et al. | 525/199 |
| 2003/0001176 | A1 * | 1/2003 | Li et al. | 257/295 |
| 2009/0026513 | A1 * | 1/2009 | Johansson et al. | 257/295 |

* cited by examiner

*Primary Examiner* — Jeffrey Wollschlager
*Assistant Examiner* — Stella Yi
(74) *Attorney, Agent, or Firm* — James M. Kasischke; Michael P. Stanley; Jean-Paul A. Nasser

(57) ABSTRACT

Disclosed herein is a method to produce a semi-crystalline fluoro-polymer film. A semi-crystalline fluoro-polymer material is used. The material is compressed to produce the film. During compression, the material is maintained at a temperature below the melting point of the material. The compression step can be cycled to allow cooling of the material between compression stages. Alternative methods are provided for compressing the material with a co-extrusion substrate, extruding the material and utilizing mandrel expansion for the material.

25 Claims, 6 Drawing Sheets

SOLID STATE EXTRUSION OF SEMI-CRYSTALLINE FLUORO-POLYMER FILMS

STATEMENT OF GOVERNMENT INTEREST

The invention described herein may be manufactured and used by or for the Government of the United State of America for governmental purpose without payment of any royalties thereon or therefore.

BACKGROUND OF THE INVENTION

The present invention generally relates to solid state extrusion of semi-crystalline fluoro-polymer films, more specifically, to solid state extrusion of ferroelectric polymer films below the Curie transition temperature of the ferroelectric polymer.

Many polymers, copolymers, and polymer compositions can be fabricated into polymer films having a thickness of about 1000 micrometers or less. In general, polymer film forming methods include solution casting, melt pressing, and melt extrusion. Solution casting involves pouring (casting) a solution of a polymer in a solvent onto a surface and evaporating the solvent leaving a film on the surface. Melt pressing and melt extrusion of thermoplastic polymers may include forming films by pressing a molten polymer between plates or extruding the molten polymer though a slit, followed by cooling below the melting temperature of the polymer. Films with molecular orientation can be formed from semi-crystalline polymer films by biaxial tensile drawing (i.e., stretching) the film utilizing methods known in the art. Polymer films may also be formed using compressional techniques, which may include deformation of a polymer into a film by forging or extrusion of the polymer at or near the polymer melting point (e.g., solid state deformation or extrusion).

Various semi-crystalline organic polymers may have crystallites that may exist in more than one crystal morphology. These crystallites may be interconvertible while in the solid state. Typically, such polymers may exhibit a solid-solid transition (that is, a crystal-crystal transition) involving the inter-conversion of the crystal forms at a particular transition temperature. Examples of such polymers include those referred to as ferroelectric polymers which often exhibit a crystal-crystal transition from a ferroelectric crystal form to a paraelectric crystal form at a transition temperature known as a Curie temperature, $T_c$. Semi-crystalline fluoro-polymers containing the vinylidene fluoride (VDF) group are a particularly relevant example.

It has previously been reported that solid state techniques may be used to produce films from semi-crystalline polymers that have more than one crystal morphology that may be able to inter-convert. However, it has been reported that such techniques are only operable in a narrow temperature range between the crystal-crystal transition temperature on the low temperature end, and the melting temperature on the high temperature end (see "The Strength and Stiffness of Polymers"; Zachariades, A. B., Porter, R. S., Eds.; Marcel Dekker: NY, 1983, pp. 1-50.)

Solid-state processing is thought possible in this range because the morphology of the crystallite that is stable above the crystal-crystal transition temperature may have a lower modulus (i.e., stiffness) than the morphology of the crystallite that is stable below the crystal-crystal transition temperature. Often it occurs that the higher modulus crystallite is too stiff to allow solid-state processing below the crystal-crystal transition temperature. (see Aharoni, S. M.; Sibilia, J. P. *Polym. Eng. & Sci.* 1979, 19, pp. 450-455; and Aharoni, S. M.; Sibilia, J. P. *J. Appl. Polym. Sci.* 1979, 23, pp. 133-140).

Reports of attempts of solid-state processing of semi-crystalline fluoro-polymers include the following: Peterlin and Elwell (see Peterlin, A.; Elwell, I. H. *J. of Mater. Sci.* 1967, 2, pp. 1-6) reported reducing the thickness (and expanded the transverse dimensions) by subjecting polyvinylidene fluoride (PVDF) films to a rolling action in the solid state at room temperature. PVDF is a semi-crystalline, VDF-containing polymer that exhibits a crystal-crystal transition at its Curie transition temperature ($T_c$) where the rhombohedral and hexagonal crystals are at inter-conversion equilibrium. Importantly, in PVDF the $T_c$ is very close to the melting temperature. As known to one of skill in the art, PVDF may be referred to as ferroelectric polymer. PVDF polymer is capable of providing ferroelectric properties at temperatures below its Curie transition temperature. Peterlin and Elwell also reported that rolling the polymers through pinch rollers to compress the polymer substantially increased the orientation of polymer chains in the roll plane.

Nagai et al. (see Nagai, M.; Uehara, H.; Kanamoto, T. *Kobushi Ronbunshu* (in Japanese) 1996, 53, pp. 555-561; and Nagai, M.; Nakamura, K; Uehara, H.; Kanamoto, T.; Takahashi, Y.; Furukawa, T. *J. Polym. Sci.: Part B: Polym. Phys.* 1999, 37, pp. 2549-2556) and Nakamura et al. (see Nakamura, K.; Imada, K.; Takayanagi, M. *Intern. J. Polymeric Mater.* 1972, 2, pp. 71-88; and Nakamura, K.; Nagai, M.; Kanamoto, T.; Takahashi, Y.; Furukawa, T. *J. Polym. Sci.: Part B: Polym. Phys.* 2001, 39, pp. 1371-1380) reported fabricating chain-aligned PVDF films from PVDF gel films by solid-state, co-extrusion to high draw ratios at 160° C. (i.e., above the PVDF Curie transition temperature and about 10° below the PVDF melt temperature).

The chain orientation and crystallinity of the solid state modified films reported by Nagai et al. and by Nakamura et al. were significantly higher than that of PVDF films made by conventional melt extrusion and stretching processes. The degree of crystallinity, the polar (ferroelectric) crystalline content, and the Young's modulus of the films increased with draw ratio, ultimately reaching a crystalline degree in the range 73-80%, a polar crystal content of 100%, and a Young's modulus in the draw direction of 10.5 GPa at the highest ratios. The ferroelectric and piezoelectric properties were also markedly enhanced and among the highest reported for polar crystal form of PVDF.

Lee and Cakmak (see Lee, J. S. PhD, The University of Akron, 1991; Lee, J. S.; Cakmak, M. *Polymer Engineering and Science* 1993, 33, pp. 1559-1569; and Lee, J. S.; Cakmak, M. *Polymer Engineering and Science* 1993, 33, pp. 1570-1582) reported extruded rods of polyvinylidene fluoride trifluoroethylene copolymer p(VDF-TrFE) at temperatures in the range of 120 to 150° C., which is above the Curie transition temperature range (70-115° C.) of p(VDF-TrFE) and below the melt temperature (~150° C.) of these copolymer compositions.

U.S. Pat. Nos. 4,282,277, 4,341,927, 4,363,611, and 4,449,905 are directed to tooling useful for the solid state extrusion of semi-crystalline polymers. The exemplified polymers include polyolefins (e.g., polyethylene, polypropylene, polystyrene, and the like). The co-extrusion temperature ranges recited were between the heat deflection temperature and the crystalline melting temperature of the polymer.

Accordingly, solid state extrusion of polymers having a crystal-crystal transition temperatures has been limited to temperatures in a range between above the crystal-crystal transition temperature, (i.e., above the Curie transition temperature of a ferroelectric polymer) and the melting temperature.

As can be seen, there is a need for a method of solid state formation of ferroelectric polymer films at or below the Curie transition temperature of the polymer.

SUMMARY OF THE INVENTION

Accordingly, this invention is a method to produce a semi-crystalline fluoro-polymer film. A semi-crystalline fluoro-polymer material is used. The material is compressed to produce the film. During compression, the material is maintained at a temperature below the melting point of the material. The compression step can be cycled to allow cooling of the material between compression stages. Alternative methods are provided for compressing the material with a co-extrusion substrate, extruding the material and utilizing mandrel expansion for the material.

These and other features, aspects and advantages of the present invention will become better understood with reference to the following drawings, description and claims.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
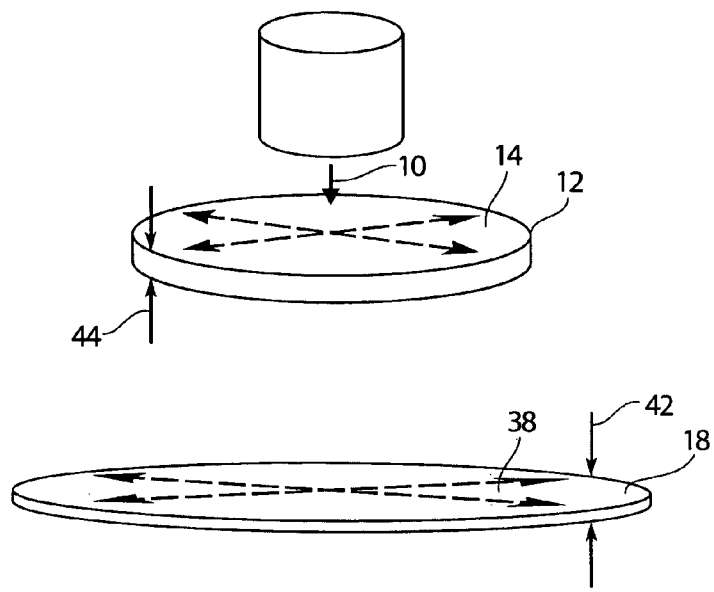
FIG. 1 illustrates solid state deformation of a polymer by forging.

The following detailed description is of the best currently contemplated modes of carrying out the invention. The description is not to be taken in a limiting sense, but is made merely for the purpose of illustrating the general principles of the invention, since the scope of the invention is best defined by the appended claims.

For the purposes of this invention and the claims thereto, and for ease of reference herein, when a polymer is referred to as comprising a particular monomer, the monomer present in the polymer is in the polymerized form. As used herein, and unless otherwise noted, the term "polymer" may include a homopolymer (i.e., a polymer comprising essentially one monomer), a copolymer (i.e., a polymer comprising two or more monomers), or a blend of homopolymers and/or copolymers. A polymer which undergoes a crystal-crystal transition need not be ferroelectric, but may be ferroelectric. In addition, for ease of reference it is to be understood that a ferroelectric polymer is a polymer capable of exhibiting ferroelectric properties when the ferroelectric polymer is at a temperature below its Curie transition temperature. As such, a ferroelectric polymer need merely be capable of exhibiting ferroelectric properties within some temperature range.

Unless otherwise noted, relevant polymers include the family of fluoro-polymers, preferably semi-crystalline fluorine containing polymers, more preferably VDF-containing fluoro-polymers. The simplest member of the family is the homopolymer (PVDF) formed by polymerizing the VDF monomer There are many relevant, semi-crystalline VDF-containing copolymer or terpolymer compositions formed by the polymerization of VDF with one, two, or more additional monomers.

The present invention generally provides a method to produce a polymeric film in the solid state, preferably a semi-crystalline, VDF-containing, fluoro-polymer film. The method may comprise solid state deformation and/or solid state extrusion of the fluoro-polymer.

The method of the present invention is suitable at temperatures ranging from the glass transition temperature of the polymer, up to the melting temperature of the polymer. Unlike the prior art, the present invention is not limited to extrusion temperatures above the crystal-crystal or Curie transition temperature of ferroelectric polymers. In fact, the present invention provides for formation of semi-crystalline fluoro-polymer films, and in particular ferroelectric polymer films over a broad temperature range extending from the glass transition temperature ($T_g$) on the low end, through the crystal-crystal (or Curie) temperature, $T_c$, to the melt temperature ($T_m$) at the high end. Thus films can be formed from a solid semi-crystalline fluoro-polymer at temperatures from just above its $T_g$ where its amorphous phase is in a rubbery state, and its crystalline content is in a ferroelectric state, up and through its crystal-crystal transition temperature where the amorphous phase is in its rubbery state and the crystalline phase converts from a ferroelectric to a paraelectric state. This was unexpected in view of prior literature reports that state that semi-crystalline polymers can only be formed in their solid-state at temperatures between their crystal-crystal transition temperatures and their melting temperatures.

In an embodiment, the polymers include semi-crystalline compositions containing covalently bound fluorine. Examples of semi-crystalline fluoro-polymers suitable for use herein may include vinylidene fluoride (VDF); trifluoroethylene (TrFE); tetrafluoroethylene (TFE); hexafluoropropylene (HFP); 1,1 chloro-fluoro ethane; 1,2 chloro-fluoro ethane; chloro tetrafluoro ethane; or a combination comprising at least one of the foregoing monomers.

Preferred copolymer compositions of the present invention include poly VDF/TrFE polymers. Poly VDF/TrFE polymers having VDF:TrFE ratios higher than about 50:50 weight to weight percent are preferable. Such ferroelectric polymers may be semi-crystalline, comprised of crystallites and an amorphous phase. The crystallites of the semi-crystalline fluoro-polymer exhibit a crystal-crystal transition, which may be a Curie transition, involving the inter-conversion of a ferroelectric crystal form (for example: an orthorhombic crystal form), which is stable at temperatures below the Curie transition temperature, to a paraelectric crystal form (for example: a hexagonal crystal form), which is stable at temperatures above the Curie transition temperature.

The degree of crystallinity varies with processing conditions and preferably may vary from about 50 weight % in as-cast films, to about 95 wt % in annealed films (e.g., films that have been heat treated.) Crystallite size within these semi-crystalline fluoro-polymer films can vary from nanometer to micrometer dimensions.

The crystallites in PVDF and in VDF-containing copolymers and terpolymers are known to crystallize in one or more of four crystal morphologies which differ in polarity. Crystal polarity is most affected by the orientation of the polar =C<$F_2$ groups (dipoles) on the polymer chain (e.g., residing in the VDF component). The most polar of these crystallites is the so-named 'β' crystallite because the =C<$F_2$ dipoles on the polymer chain adopt an all trans (tttt) conformation within this crystal in which the =C<$F_2$ dipoles are all oriented toward one crystal face with the result that a net charge separation exists over opposing crystal faces. A non-polar 'α' crystallite can also exist in which the polymer chain adopts a trans-gauche 'tgtg' conformation in which the =C<$F_2$ dipoles are oriented in an anti-parallel manner with no resultant polarization at opposing crystallite faces. In the semi-crystalline p(VDF-TrFE) copolymers, the β crystallite has a lower free energy than the α crystallite and hence is the stable form at temperatures below $T_c$. At higher temperatures the α form is stable. At $T_c$ the β crystal transforms to the α crystal—a crystal-crystal or solid-solid transition. Associated with this transition is an expansion in volume since the representative α crystal unit cell is larger than those of the β-crystal unit cell.

Crystallites, including polar crystallites, can be randomly oriented within a film such that no net polarization develops across the surfaces of the film either because the crystallites themselves are non-polar or because polar domains within the crystallites are randomly oriented in the film. Typically, the polar orientation of crystallites in a film can be aligned by strong applied electric fields, a process known as poling. In this process, randomly oriented polar domains within crystallites may be oriented so that the direction of essentially all of their polarities is aligned normal to the film surfaces.

In crystallites of semi-crystalline, VDF-containing, fluoro-polymer films the polar orientation of domains within the crystallites can be aligned by applying an E-field with a magnitude greater than the coercive field (Ec). During alignment the dipoles on the polymer chain are caused to rotate to an orientation most closely parallel to the applied field.

In an embodiment, the method of the present invention may include solid state deformation of semi-crystalline fluoro-polymers as shown in FIG. 1, wherein a polymer sample 12, which may comprise a semi-crystalline fluoro-polymer, and which has an initial surface area 14, is compressed to produce a semi-crystalline fluoro-polymer film 18 having a final film surface area 38. Solid state deformation may thus result in radial deformation of polymer sample 12 into semi-crystalline fluoro-polymer film 18. In an embodiment, semi-crystalline fluoro-polymer film 18 may be a ferroelectric fluoro-polymer film.

The applying step of the present invention may comprise a compression pressure 10 being applied to polymer sample 12. Preferably, polymer sample 12 is maintained at a compression temperature while the compression pressure is applied. The compression temperature may be below the melting temperature of the semi-crystalline fluoro-polymer, below a crystal-crystal transition temperature of the semi-crystalline fluoro-polymer and/or below the Curie transition temperature of the ferroelectric polymer. The compression pressure 10 (i.e., compression force per unit area) may be applied at a magnitude, and for a period of time sufficient to increase the initial surface area 14 of polymer sample 12 relative to the surface area of the same semi-crystalline fluoro-polymer prior to the applying step, to produce semi-crystalline fluoro-polymer film 18. This semi-crystalline fluoro-polymer film may have crystallites which can exist in two or more intra-convertible crystal forms. After the applying step, film thickness 42 of semi-crystalline fluoro-polymer film 18, which may be a ferroelectric fluoro-polymer film, is less than an original sample thickness 44 of polymer sample 12. The desired film thickness 42 may depend on the final application or use of semi-crystalline fluoro-polymer film 18.

Accordingly, for purposes herein, semi-crystalline fluoro-polymer film 18 may comprise crystallites which can exist in two or more intra-convertible crystal forms, and may have a final film surface area 38 which is greater than initial surface area 14 of polymer sample 12 prior to the applying step.

In an embodiment, semi-crystalline fluoro-polymer film 18 of the present invention may have a film thickness 42 of less than or equal to about 1000 micrometers (i.e., 1 mm). In another embodiment, a semi-crystalline fluoro-polymer film of the present invention may have a film thickness 42 greater than or equal to about 0.1 micrometers. Preferably, film thickness 42 of semi-crystalline fluoro-polymer film 18 is about 100 micrometers or less, preferably about 50 micrometers or less. Also preferably, film thickness 42 of semi-crystalline fluoro-polymer film 18 is about 1 micrometer or greater, preferably about 5 micrometers or greater, with about 10 micrometers or greater being more preferred.

The amount by which initial surface area 14 of polymer sample 12 may be increased during the applying step to produce semi-crystalline fluoro-polymer film 18 may be expressed in terms of a compression ratio, which is defined for purposes herein as final film surface area 38 divided by initial surface area. In an embodiment, the compression ratio may be greater than 1, preferably greater than 1.1, more preferably greater than 1.5, still more preferably greater than 2, still more preferably greater than 3, still more preferably greater than 3.5, still more preferably greater than 4, still more preferably greater than 4.5, still more preferably greater than 5, still more preferably greater than 5.5, still more preferably greater than 6.

During the applying step, polymer sample 12 may be compressed at a compression pressure 10 of greater than or equal to about 10,000 pounds per square foot (lbs/ft$^2$, 0.480 MPa). Higher pressures are preferable to lower pressures. Most preferably the pressure should be greater than 150,000 lbs/ft$^2$ (7.2 MPa). The magnitude of compression pressure 10 may be a function of the desired film thickness 42 of semi-crystalline fluoro-polymer film 18 produced.

In an embodiment, the applying step of the present invention may be conducted (e.g., compression pressure applied to polymer sample 12) in a single step or in multiple steps. Application of compression pressure 10 to polymer sample 12 may however, result in an increase in temperature of polymer sample 12. Accordingly, to maintain the semi-crystalline fluoro-polymer of polymer sample 12 below either a crystal-crystal transition temperature (e.g., a Curie transition temperature) or the melt temperature, or at or below another temperature as the case may be during the applying step, compression pressure 10 may be applied to polymer sample 12 while polymer sample 12 is being simultaneously cooled (e.g., heat being removed). This may be accomplished by providing cooling to the compression components or apparatus, and/or to polymer sample 12 itself either during the applying step, before the applying step, or a combination thereof.

In another embodiment, the applying step may comprise a plurality of applying cycles. Each applying cycle may comprise the application of at least a portion of compression pressure 10 to polymer sample 12, followed by a resting period or step wherein no additional compressional pressure (force) is applied to polymer sample 12. In this way, the heat generated during each of the applying cycles (e.g., application of compression pressure 10) resulting in a temperature increase of polymer sample 12, may be allowed to dissipate, either through natural convection, or through active removal of the heat (e.g., cooling of polymer sample 12, cooling of the compression apparatus, or both). Accordingly, the applying step may comprise one or more applying cycles which may be repeated a plurality of times.

In one embodiment, the applying step may comprise one or more applying cycles, each applying cycle comprising the steps of applying at least a portion of the total compression pressure 10 to polymer sample 12, followed by maintaining that compression pressure for a rest period wherein heat may be removed from the sample, from the extrusion equipment, or both. In subsequent applying cycles, the remainder of the total compression pressure 10 may then be applied to polymer sample 12 incrementally.

In an alternative embodiment, the applying step may comprise one or more applying cycles comprising the steps of applying at least a portion of the compression pressure 10 to polymer sample 12, followed by a release of at least a portion of that compression pressure 10 during the rest period wherein heat may be removed from polymer sample 12, from the compression/extrusion equipment, or both. In subsequent applying cycles, the remainder of the total compression pressure 10 may then be applied.

In yet another embodiment, the applying step may comprise one or more applying cycles comprising the steps of applying the total compression pressure 10 to polymer sample 12, followed by removal of at least a portion of that compression pressure 10 during a rest period wherein heat may be removed from the sample, from the extrusion equipment, or both. In subsequent applying cycles, the full or total compression pressure 10 may be applied to polymer sample 12 until semi-crystalline fluoro-polymer film 18 having the desired properties has been produced.

In an embodiment, the applying step comprises at least two of any of the above described applying cycles. Preferably, the applying step comprises five or more of any of the above described applying cycles, more preferably the applying step of the present invention comprises ten or more of any of the above described applying cycles.

The applying cycles may each apply an equal increase of the compression pressure to polymer sample 12 such that the total compression pressure 10 is applied in uniform increments (e.g., such that the compression pressure of each applying cycle is increased by a uniform amount.) In another embodiment, compression pressure 10 of each applying cycle may increase or decrease by a non-uniform amount (e.g., the total compression pressure 10 may be applied using applying cycles wherein an increase in an amount of the compression pressure from one cycle to another is different than the increase in compression pressure between to other applying cycles.)

Figure 2:
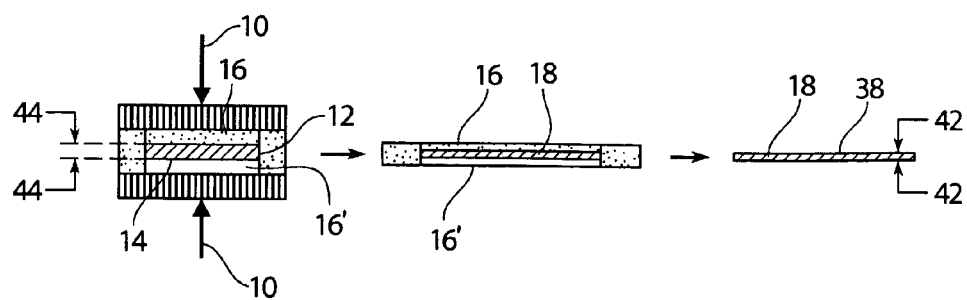
FIG. 2 illustrates the steps of a method of the present invention.
Figure 5A:
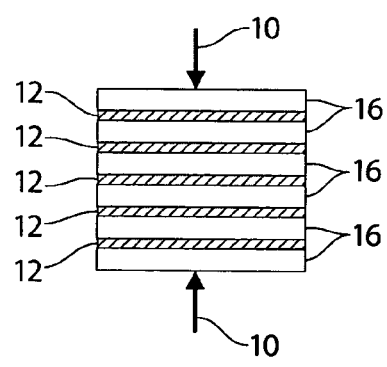
FIGS. 5a and 5b illustrate arrangements of ferroelectric polymers disposed on co-extrusion substrates.
Figure 5B:
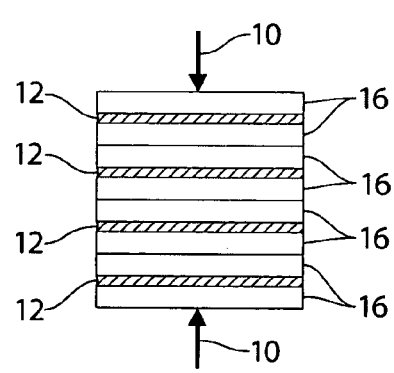

As shown in FIG. 2, the method of the present invention may also include co-forging polymer sample 12 to produce semi-crystalline fluoro-polymer film 18, preferably a ferroelectric polymer film. In this embodiment, the method to produce semi-crystalline fluoro-polymer film 18 may comprise a disposing step, wherein polymer sample 12, which may itself be an annealed polymer sample, a film, an annealed film, a cast film, or a sheet of initial surface area 14 is disposed, arranged and/or mounted between two layers of a co-extrusion substrate 16 (or co-extrusion substrates 16 and 16'). In an alternative embodiment shown in FIGS. 5a and 5b, a plurality of discrete polymer samples 12 may each individually be disposed between two separate layers of co-extrusion substrate 16 to produce a plurality of alternating layers of co-extrusion substrate 16 and polymer samples 12. Accordingly, the disposing step may comprise arranging a plurality of discrete polymer samples 12 each individually between a plurality of layers of co-extrusion substrate 16 to produce a plurality of alternating layers of the plurality of discrete polymer samples 12 each layer being separated from another by one or more layers of co-extrusion substrate 16 (and/or 16').

Referring to FIG. 2, during the applying step, compression pressure 10 is applied to polymer sample 12 through co-extrusion substrate 16 at a compression temperature below the melt temperature, preferably below a crystal-crystal transition temperature, and/or below the Curie transition temperature of the semi-crystalline fluoro-polymer of polymer sample 12, for a period of time sufficient to produce semi-crystalline fluoro-polymer film 18 between the layers of co-extrusion substrate 16. During the applying step, both polymer sample 12 and co-extrusion substrate 16 may undergo an increase in surface area. As described above, semi-crystalline fluoro-polymer film 18 has a final film surface area 38 which is greater than initial surface area 14 of polymer sample 12, likewise semi-crystalline fluoro-polymer film 18 has a film thickness 42 which is less than original sample thickness 44 of polymer sample 12.

As shown in FIG. 2, the method of the present invention may also include a removing step, wherein semi-crystalline fluoro-polymer film 18 may be removed from one or more of co-extrusion substrates 16 once formed, thereby rendering one or more layers of co-extrusion substrate 16 a sacrificial component of the inventive method.

The layers of co-extrusion substrate 16 (and/or 16') may comprise the same material, or may comprise different materials from one another. Co-extrusion substrate 16 may comprise a thermoplastic resin, with polyamide resins (Nylon) being preferred.

Figure 3:
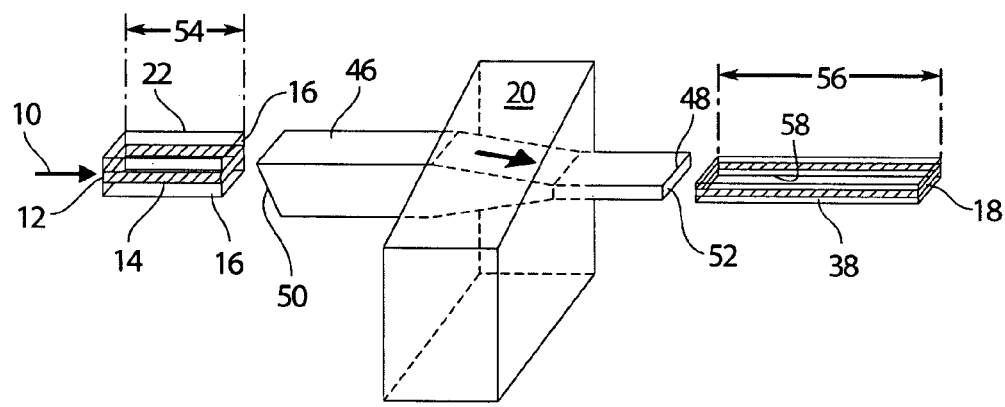
FIG. 3 illustrates co-extrusion according to an alternative embodiment of the present invention.

In another embodiment of the present invention, as shown in FIG. 3, a semi-crystalline fluoro-polymer film may be produced by solid-state co-extrusion of the semi-crystalline fluoro-polymer. The method may comprise the steps of disposing polymer sample 12, having an initial surface area between layers of co-extrusion substrate 16 to produce an extrusion billet 22. Similar to the embodiment shown in FIGS. 5a and 5b, extrusion billet 22 may comprise a plurality of discrete polymer samples 12 each individually disposed between two separate layers of co-extrusion substrate 16 (and/or 16 and 16') to produce a plurality of alternating layers of co-extrusion substrate 16 and polymer samples 12.

The co-extrusion method may also include arranging extrusion billet 22 within a die inlet 46 of an extrusion die 20, wherein extrusion die 20 comprises die inlet 46 in communication with a die outlet 48. Die inlet 46 may have an inlet cross sectional area 50 which is greater than an outlet cross sectional area 52 of die outlet 48. The method may also comprise an applying step, wherein compression pressure 10 is applied against extrusion billet 22 to force at least a portion of extrusion billet 22 through extrusion die 20 from die inlet 46 to die outlet 48, wherein the thickness of extrusion billet 22 passing through die outlet 48 is reduced relative to the thickness of extrusion billet 22 passing through die inlet 46. Accordingly, an extruded billet length 56 of an extruded billet 58 after extrusion is greater than a billet length 54 of extrusion billet 22 before extrusion. Semi-crystalline fluoro-polymer film 18 is thus produced between the outer and inner layers of co-extrusion substrate 16. During the applying step, polymer sample 12 is maintained at a temperature below the melting point of the semi-crystalline fluoro-polymer composition of polymer sample 12, preferably below a crystal-crystal or Curie transition temperature of the semi-crystalline fluoro-polymer. Accordingly, semi-crystalline fluoro-polymer film 18 so produced has a final film surface area 38 which is greater than initial surface area 14 of polymer sample 12. In an embodiment, heat may be removed from extrusion die 20 during the applying step or steps.

Figure 4:
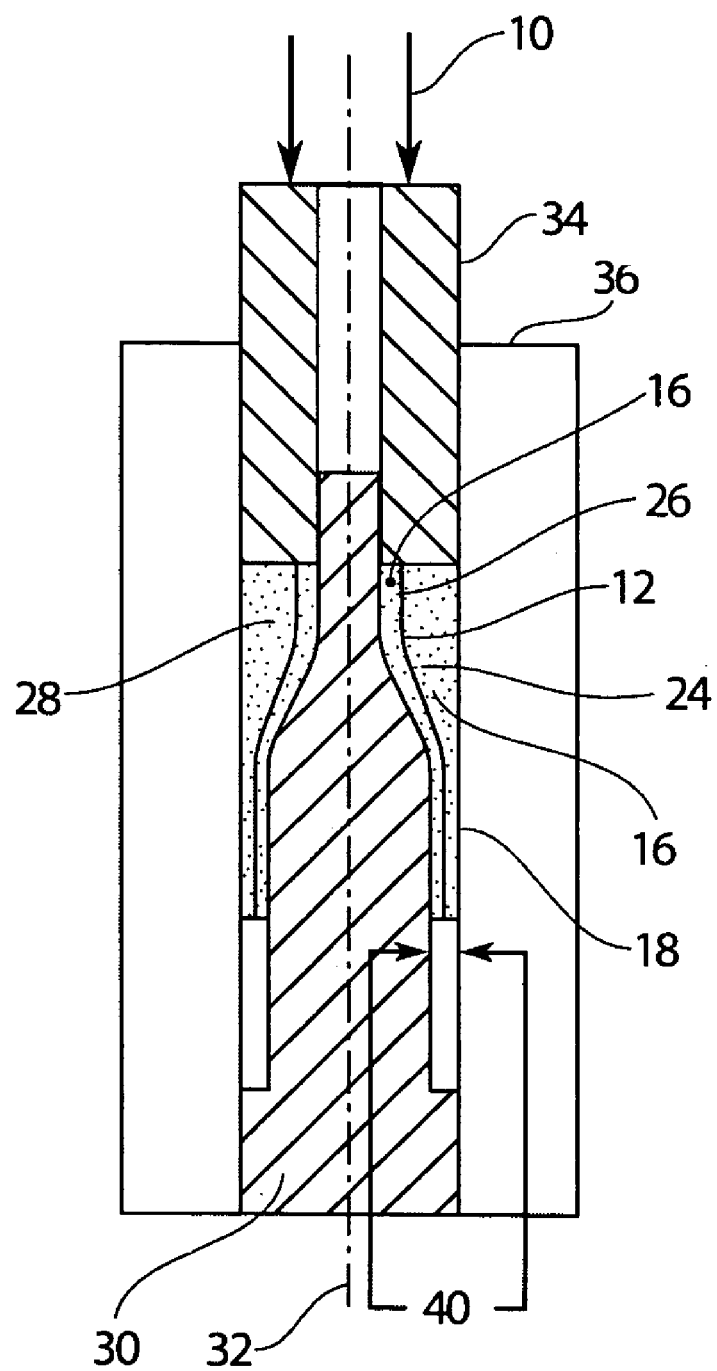
FIG. 4 illustrates co-extrusion according to an alternative embodiment of the present invention.

In another embodiment, formation of semi-crystalline fluoro-polymer film 18 may be accomplished by expanding polymer sample 12 about an expansion mandrel 30. FIG. 4 depicts an expansion mandrel 30 disposed in an extrusion chamber 36 having a concentric cylindrical arrangement (i.e., having a circular cross section), in particular a frustoconical shape. However, expansion mandrel 30 and the corresponding extrusion chamber 36 may comprise any number of geometric cross sections.

Taking the embodiment shown in FIG. 4 as an example, an embodiment of the present invention may include a disposing step, wherein polymer sample 12 comprising a semi-crystalline fluoro-polymer and having an initial surface area (not shown) may be arranged between an outer layer 24 of a co-extrusion substrate and an inner layer 26 of co-extrusion substrate 16, to produce a cylindrical extrusion billet 28 dimensioned and arranged such that at least of portion of which is disposable about expansion mandrel 30. As such, the layers of cylindrical extrusion billet 28 may comprise a semi-crystalline fluoro-polymer sandwiched between outer layer 24 and inner layer 26 of co-extrusion substrate 16, which are dimensioned and arranged such that inner layer 26 fits at least partially within outer layer 24. Cylindrical extrusion billet 28 may then be radially arranged about a portion of expansion mandrel 30. In an embodiment, expansion mandrel 30 may comprise frustoconical shape along a central axis 32, such that the diameter of expansion mandrel 30 increases from one end to the other along collinear with central axis 32. Solid state extrusion of polymer sample 12 according to the method shown in FIG. 4 may produce a semi-crystalline fluoro-polymer film 18 which may be bi-axially oriented and semi-crystalline.

The method may also comprise the applying step as disclosed previously, wherein compression pressure 10 is applied against cylindrical extrusion billet 28 (e.g., using a ram 34) such that cylindrical extrusion billet 28 is forced over expansion mandrel 30 (e.g., co-linear with central axis 32). The applying step may thus result in the surface area of cylindrical extrusion billet 28 (not shown) being increased, to produce semi-crystalline fluoro-polymer film 18 sandwiched between outer layer 24 of co-extrusion substrate 16 and inner layer 26 of co-extrusion substrate 16. In an embodiment, outer layer 24 of co-extrusion substrate 16 may comprise the same material as inner layer 26 of co-extrusion substrate 16. In another embodiment, outer layer 24 of co-extrusion substrate 16 may comprise a different material than inner layer 26 of co-extrusion substrate 16.

To maintain the temperature of the semi-crystalline fluoro-polymer film during the applying step, extrusion mandrel 30, extrusion chamber 36, and/or ram 34 may be cooled to maintain polymer sample 12 at a temperature below the melting point of the semi-crystalline fluoro-polymer composition of polymer sample 12, and co-extrusion substrate 16 composition(s), preferably below the crystal-crystal or Curie transition temperature of the semi-crystalline fluoro-polymer of polymer sample 12 during the applying step.

As shown in FIG. 4, expansion mandrel 30 may be concentrically disposed within extrusion chamber 36 such that at least a portion of an inner wall of extrusion chamber 36 is separated from an outer surface of expansion mandrel 30 by an extrusion clearance distance 40. Expansion mandrel 30, extrusion chamber 36, co-extrusion substrates 16, and polymer sample 12 are preferably dimensioned and arranged to produce void-free semi-crystalline fluoro-polymer films 18. The dimensions of one or more of the various components shown in FIG. 4 may allow for producing semi-crystalline fluoro-polymer films 18 having varying degrees of polymer extension and alignment.

Accordingly, in an embodiment, the method of the present invention teaches production of a semi-crystalline fluoro-polymer film. This includes the steps of disposing polymer sample 12 comprising a semi-crystalline fluoro-polymer between outer layer 24 of co-extrusion substrate 16 and inner layer 26 of co-extrusion substrate 16. An extrusion billet 22 is produced having an initial billet surface area (not shown). An inner layer 24 of extrusion billet 22 is fitted radially about expansion mandrel 30, and compression pressure 10 is applied against extrusion billet 22. At least a portion of extrusion billet 22 is forced over expansion mandrel 30, such that a final surface area of extrusion billet 22 is larger than the initial billet surface area (not shown). This produces semi-crystalline fluoro-polymer film 18 between outer layer 24 and inner layer 26 of co-extrusion substrate 16. In an embodiment, semi-crystalline fluoro-polymer film 18 has a final film surface area 38 which is greater than an initial surface area 14 of polymer sample 12. Preferably, polymer sample 12 is maintained at a compression temperature below a melting temperature of the semi-crystalline fluoro-polymer of polymer sample 12 during applying of compression pressure 10.

In a preferred embodiment, outer layer 24 and inner layer 26 of co-extrusion substrates 16 comprise concentric cylinders, wherein outer layer 24 is dimensioned to be radially disposable about at least a portion of inner layer 26, and wherein inner layer 24 is dimensioned to be radially disposable about at least a portion of expansion mandrel 30, preferably expansion mandrel 30 has a frustoconical shape.

In an embodiment, solid-state co-extrusion conditions as described herein may be manipulated to generate semi-crystalline fluoro-polymer films 18 comprising conformational defects in crystallites. Such semi-crystalline fluoro-polymer films 18 may exhibit enhanced strains and lowered dielectric and elastic hysteretic losses when excited by alternating applied E-fields, when compared to films prepared by casting or melt processing techniques. It is thought that the shearing which may occur under solid-state deformation or solid state extrusion conditions disclosed herein reduces the crystallites of the semi-crystalline fluoro-polymer of polymer sample 12 and introduces conformational defects into semi-crystalline fluoro-polymer films 18.

Semi-crystalline fluoro-polymer solid-state processed films of the present invention may exhibit excellent elastic, electrical, dielectric and electromechanical properties, which are an improvement over irradiated and/or stretched films. Improved elastic properties gained by the inventive solid-state processing can be designed to fabricate films with varying degrees of crystallinity and molecular orientation (i.e., polymer chain extension and alignment). Varying degrees of uni- and biaxial molecular orientation can be achieved with consequent enhancements in tensile strength and stiffness.

It has been discovered that films of the present invention may possess improved electrical properties over irradiated and/or stretched films. Compared to the orientation and property enhancements that can be produced by tensile drawing, solid-state processing generates the molecular orientation under high compressional stresses. Accordingly, semi-crystalline fluoro-polymer films of the present invention may have fewer voids and closer-packed polymer chains than do polymer films known in the art, contributing to higher densities and higher dielectric breakdown strengths over conventional semi-crystalline fluoro-polymer films.

Films of the present invention may also possess improved dielectric properties, as compared to irradiated and/or stretched films. The crystallites in p(VDF-TrFE) films are organized in assemblies having a spherulitic shape. The compressional stresses in the disclosed solid-state processing of the present invention can be used to deform (i.e., 'squash') the spherulitic assemblies, which may cause a rearrangement of polymer chains in the amorphous and crystalline components of the spherulite and inter-spherulite regions of the semi-crystalline fluoro-polymer. Rearrangement may be accomplished by the introduction of conformational defects. When the deformation and rearrangement occurs in a crystallite, it may become a conformational defect in the polymeric films of the present invention. Conformational defects referred to herein may thus be departures from the 'all trans' or tttt conformation of a perfect ferroelectric crystallite in p(VDF-TrFE) films. The trans-gauche, $t_g$, confirmation is an example of such a conformational defect, when it occurs in an all trans crystallite. Conformational defects which occur in the inventive semi-crystalline fluoro-polymer films may add rotational mobility to the dipoles of the crystallite and thereby may lead to elevated (and thus improved) dielectric constants when compared to other semi-crystalline fluoro-polymer films known in the art.

Films of the present invention may also possess improved electromechanical properties, as compared to irradiated and/or stretched films. Conformational defects generated in the films by the methods of the present invention may also act to reduce the size of ferroelectric domains in crystallites and the size of crystallites themselves in the inventive semi-crystalline fluoro-polymer films. As such, semi-crystalline fluoro-polymer films of the present invention, having smaller crystallites and thus smaller ferroelectric domains as compared to known semi-crystalline fluoro-polymers, may be polarized and switched in polarity more easily (i.e., though use of lower applied coercive electric fields, Ec) and with lower hysteresis (i.e., slimmer hysteresis in electric displacement vs alternating E-field loops "D-E loops"). Semi-crystalline fluoro-polymer films of the present invention may exhibit thickness and longitudinal strains, x, under cyclic E-fields. Associated with this slim D-E loop is a slim x-E (displacement vs. electric field) hysteresis loop. The low energy loss associated with the thin hysteresis loops of the present invention may be a key property requirement of electro-mechanical transducers (e.g., actuators, sound projectors) and the like.

In an embodiment, the semi-crystalline fluoro-polymers of the present invention are such that below the coercive field Ec, the dimensions of polar p(VDF-TrFE) crystallites may vary linearly with the strength of an applied electric field (E-field). As a result of the aggregate dimensional changes of all the crystallites in a film, the film's dimensions may thus change as a function of an applied E-field. For example, in an embodiment of the present invention, the semi-crystalline fluoro-polymer film produced may have a thickness or a film length and width that may vary under the influence of an E-field applied to opposite faces of the film. A measure of the magnitude of this effect is the ratio $d_{33}$, which is defined as the change in dimension ($\Delta x$) divided by change in electric field strength ($\Delta E$): $d_{33}=(\Delta x)/(\Delta E)$ This property of the inventive semi-crystalline fluoro-polymer films may have important technological applications. For example, the films of the present invention may be used as actuators or sound generators by utilizing the change in film dimension to cause low or high frequency stress or pressure waves in the environment around them when the films are actuated by low or high frequency E-fields, respectively.

In an embodiment, the present invention may comprise semi-crystalline fluoro-polymer film 18 produced according to any one of the methods, either alone or in combination, as disclosed herein. In an embodiment, semi-crystalline fluoro-polymer film 18 may have crystallites which can exist in two or more intra-convertible crystal forms. In another embodiment, semi-crystalline fluoro-polymer film 18 may have a thickness of less than 1000 micrometers and greater than 0.1 micrometers. In an alternative embodiment, the present invention may comprise an electrical device comprising semi-crystalline fluoro-polymer film 18 produced according to any one of the methods, either alone or in combination, as disclosed herein.

Accordingly, semi-crystalline fluoro-polymer film 18 of the present invention may have applications as sensors of pressure (low frequency stresses to acoustic and ultrasound frequency pressure disturbances) since such applied stresses may cause changes in dimension of the film and consequent change in voltage in electrodes on the film (the so-called 'converse effect').

EXAMPLES

Solid State Co-Forging

In the following examples, semi-crystalline fluoro-polymer samples of 65/35 wt/wt p(VDF-TrFE) were deformed while in the solid state. The 65/35 p(VDF-TrFE) composition is a semi-crystalline fluoro-polymer which exhibits an endothermic, ferroelectric to paraelectric crystal-crystal transition at temperatures in the range of 70 to 115° C. (i.e., $T_c$=70-115° C., as observed by differential scanning calorimetry.)

Semi-crystalline fluoro-polymer samples used in the examples were circular plugs having an initial dimension of a 0.75 inch diameter×0.004" thickness were sandwiched between two nylon discs (the co-extrusion substrate) and loaded into a 1" O.D. nylon tube to form a 1" O.D.×3/8" high assembly. The assembly was placed between the platens of a 100,000-lb/ft² press, wherein the compressional pressure was applied for solid-state co-forging. The platen had a temperature sensor mounted close (within 0.05") to the polymer specimen to monitor any temperature rise that may have occurred during application of the compressional pressure.

Heat is generated during co-forging and causes the temperature of the semi-crystalline fluoro-polymer-nylon assembly to rise sharply. The heat may be generated by mechanical energy that is deposited (i.e., energy not recovered) in the semi-crystalline fluoro-polymer-nylon assembly when compression stress is applied. This is V$\Delta$P work energy where V represents the volume of the p(VDF-TrFE) polymer sample and the nylon sheets; $\Delta P$ is the change in compression stress or compression pressure. Since the mass of the nylon component is 50-100 times greater than that of the semi-crystalline fluoro-polymer sample, most of the heat generated may be in the nylon component (i.e., the co-extrusion substrate).

Example 1

Figure 6:
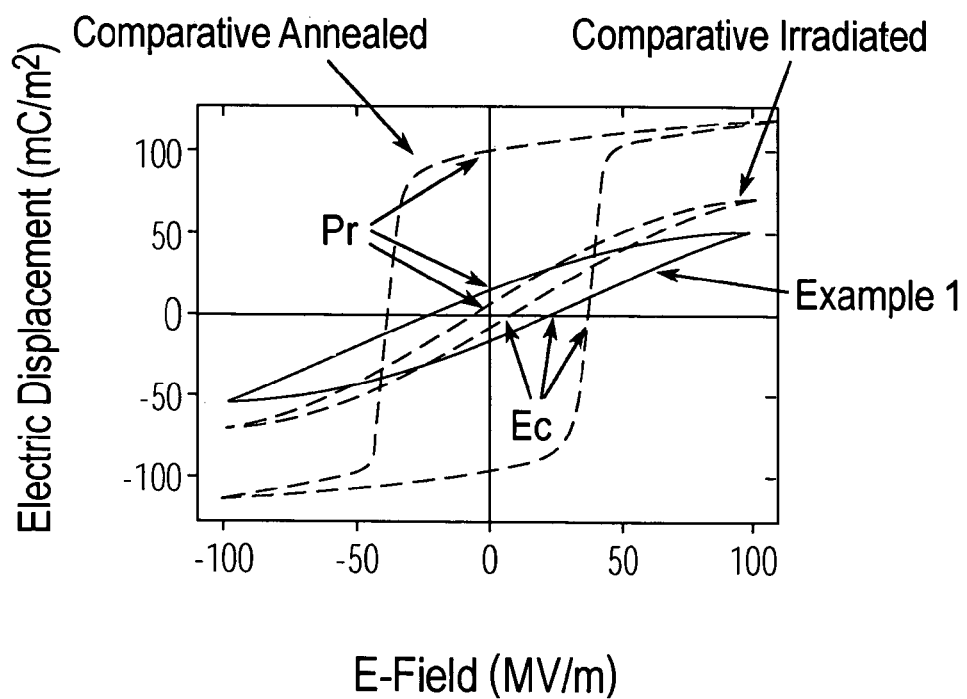
FIG. 6 shows a Sawyer-Tower plot comparing a ferroelectric polymer film of the present invention to annealed and irradiated films.

A semi-crystalline fluoro-polymer film was formed by rapidly forging a film at 20° C. This deformation has an effect on the electric displacement vs. E-field property (i.e., the D-E loop depicted using Sawyer-Tower measurements of the electric displacement vs. electric field, E at 1 Hz and 25° C.) FIG. 6 shows a comparison of D-E loops for comparative annealed samples, comparative irradiated semi-crystalline fluoro-polymer films, and a ferroelectric film produced according to the present invention. As can be seen in FIG. 6, the inventive solid-state deformation has a similar effect on the D-E loop as comparative irradiation. Both Example 1 and the comparative irradiated films exhibit 'slimmer' D-E loops compared to a comparative annealed film. The loops are slimmer because both the remanent polarization, Pr, and coercive field, Ec, parameters are smaller. This is evidence that solid-state deformation of the present invention, like irradiation, introduces conformational defects into the semi-crystalline fluoro-polymer films.

TABLE 1

Solid State Co-forged Semi-crystalline fluoro-polymer Films

| Example # | Polymer Source | Temperature Initial °C. | Temperature Final °C. | Applying Step(s) Steps* | Applying Step(s) Pause (Sec) | Compression Ratio Final/initial |
|---|---|---|---|---|---|---|
| 1 | As cast | 20 | 98 | 1 | 0 | >1 |
| 2 | As cast or Annealed | 20 | 98 | 1 | 0 | 3.2-3.6 (Range of several samples) |
| 3 | As cast | 0 | 78 | 1 | 0 | 3 |
| 4 | As cast | -12 | 60 | 1 | 0 | 2.2-2.7 (Average of 3 samples) |
| 5 | As cast | -43 | 35 | 1 | 0 | 2.3-3.2 (Average of 3 samples) |
| 6 | As cast | -47 | -25 | 5 | 60 | 2.5 |
| 7 | Annealed | -50 | -32 | 5 | 60 | 2.7 |
| 8 | Annealed | -50 | -33 | 9 | 60 | 2.7 |
| 9 | Annealed | -55 | -34 | 5 ($1^{st}$) 14 ($2^{nd}$) | 60 ($1^{st}$) 45 ($2^{nd}$) | 2.3 ($1^{st}$) 7.9 ($2^{nd}$) |

Steps* 1 step compression in 3 seconds with 45 second hold at total compression pressure.

Example 2

In Example 2, an as-cast polymeric film and an annealed semi-crystalline fluoro-polymer film of p(VDF-TrFE) were compressed in one 3 second step with a 45 second hold time at the compression pressure. Heat was generated causing the instantaneous temperature rise from an initial temperature of 20° C. to about 78° C. After the applying step, the Example 2 semi-crystalline fluoro-polymer film, which was thinner and larger in surface area than the initial semi-crystalline fluoro-polymer sample. The semi-crystalline fluoro-polymer film, was recovered by peeling away the nylon co-deformation components. The compression ratio (i.e., film surface area divided by initial area) was 3.2 to 3.6. The films were deformed at temperatures below $T_c$ for the semi-crystalline fluoro-polymer, where the crystallites in the polymer film exist in a higher modulus ferroelectric form. The data is in Table 1.

Examples 3, 4, and 5

In these experiments, the maximum temperature seen by the films was controlled to be in the range 35-78° C. by chilling the forging assembly to 0° C. (Example 3), -12° C. (Example 4), and -43° C. (Example 5) prior to the applying step. These chilled assemblies were then compressed in one step lasting 3 seconds. Compression ratios of 2.2 to 3.2 were achieved. The temperature of deformation was always below $T_c$ where the crystallites in the film were in the higher modulus ferroelectric state. The data are in Table 1, Examples 4 and 5 represent an average of 3 samples each.

Examples 6 and 7

This experiments illustrate that either as-cast or annealed 65/35 p(VDF-TrFB) polymer films can be co-deformed according to the present invention. In these experiments, the maximum temperature seen by the films did not exceed -25° C. This was achieved by chilling the assemblies to -50° C. and pressing in 5 applying cycles, each comprising application of the full compression pressure in 3 seconds with a 45 second pause at that compression pressure, followed by release of the pressure for a 60 second pauses to allow heat to dissipate.

Example 6 was co-deformed from an as-cast 65/35 w/w p(VDF-TrFE) polymer. Example 7 was co-deformed from a 65/35 w/w p(VDF-TrFE) polymer composition that had been annealed at 140° C. for 19 hours to enhance its degree of crystallinity. The data are in Table 1.

Figure 7:
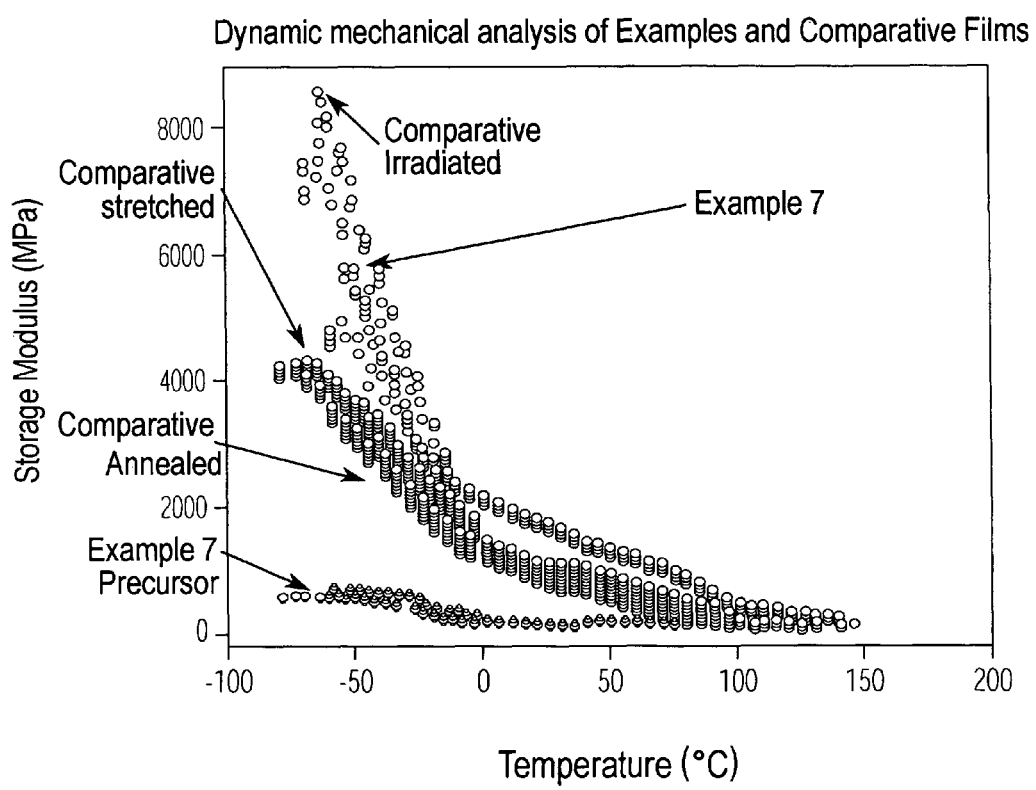
FIG. 7 shows dynamic mechanical analysis of Examples of the present invention.

FIG. 7, shows the results of dynamic mechanical analysis scans of Examples 6 and 7, along with the polymer samples the Example films were formed from. The semi-crystalline fluoro-polymer films of the present invention show a broad substantial decrease in modulus from -60 to 0° C. and a further, small drop from 50-100° C. The former drop is attributed to components of the amorphous phase becoming less rigid as the temperature rises above their glass transitions. The latter drop is attributed to the softening of the crystalline phase as the temperature rises above $T_c$.

Figure 8:
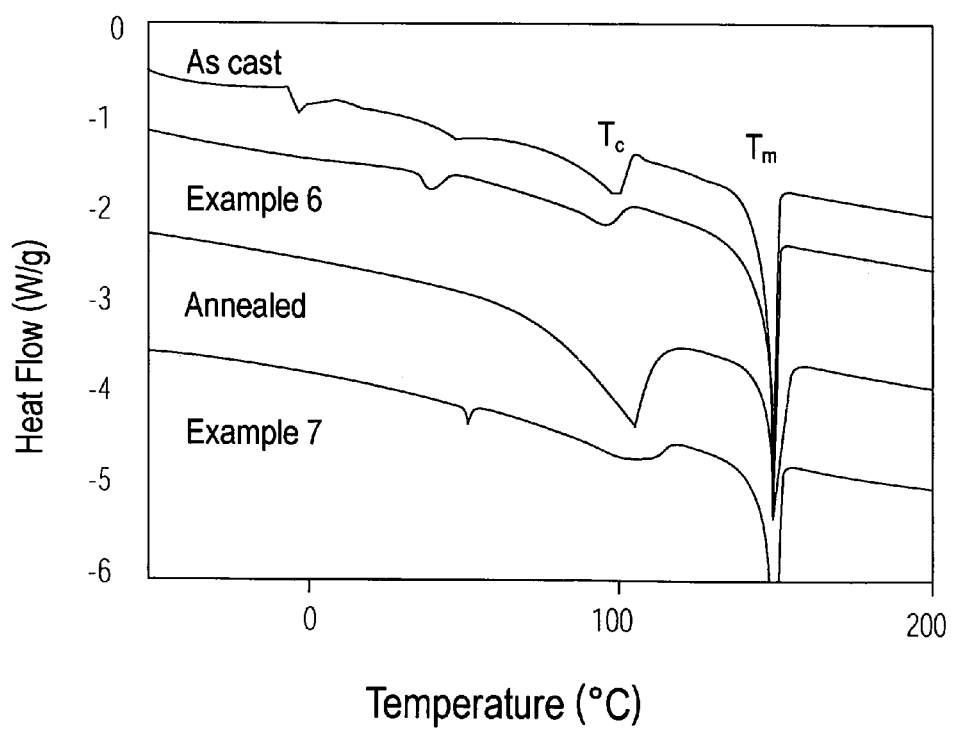
FIG. 8 shows Differential Scanning Calorimetry analysis of Examples of the present invention.

FIG. 8 shows (1st heat) differential scanning calorimetry scans of the comparative as-cast, comparative annealed, and both Examples 6 and 7. The enthalpies of the Curie and melt transitions were evaluated from the areas of the $T_c$ and $T_m$ peaks in FIG. 8 and are tabulated in Table 2.

TABLE 2

DSC of the solid state forged films of Examples 6 and 7 compared to their as-cast and annealed precursor films

| Sample | Enthalpy Curie Transition (J/g) | Enthalpy Melting (J/g) | Crystallinity* % |
|---|---|---|---|
| Comparative As Cast (Example 6 precursor) | 10.7 | 22 | 56 |
| Example 6 | 6.4 | 31 | 80 |
| Comparative Annealed (Example 7 precursor) | 17.3 | 24 | 62 |
| Example 7 | 19.9 | 34 | 88 |

Crystallinity*, Enthalpy of melting of 100% crystalline polymer = 39 J/g

The annealed film had a higher crystalline degree (62%) than the as-cast film (56%). Co-deforming the as-cast semi-crystalline fluoro-polymer film (Example 6) and the annealed semi-crystalline fluoro-polymer film (Example 7) increased the crystalline degrees to 80 and 88% respectively. A broader range of ferroelectric crystallite sizes in the film that was co-deformed according to the method of the present invention from the as-cast semi-crystalline fluoro-polymer is suggested by the more diffuse Curie transition in Example 6 (see FIG. 8).

Examples 8 and 9

These experiments illustrate that double co-forging of annealed films and high compression ratios are feasible. The film in Example 8 was formed from an as cast 65/35 p(VDF-TrFE) polymer film that was annealed at 140° C. for 15 hours. The assembly of the annealed polymer film between nylon sheets was cooled to −50° C. and the compressional pressure applied in 9 steps of 3 to 7 seconds application followed by 45 seconds hold, and then the pressure was released for 60 second pauses. This yielded a forged film with a compression ratio of 2.7.

The film in Example 9 was produced by applying a compression pressure to the film produced in Example 8 a second time. The Example 8 forged film was recovered and re-mounted in new assembly between nylon sheets, chilled to −59° C., and pressed a second time in 14 steps (3 second full compression pressure and hold for 45 seconds, followed by release of the pressure for 45 second pauses. The final compression ratio of the double forged Example 9 film was 7.9.

The maximum temperature seen by the semi-crystalline fluoro-polymer films of Examples 8 and 9 was <−30° C. and therefore always below the $T_c$ of the crystallites in the film and were therefore in their ferroelectric crystal form.

Solid-State Co-Extrusion

In the following examples a technique for solid-state co-extrusion of p(VDF-TrFE) films using the tool in FIG. 4 is described. An extrusion billet was assembled, consisting of the p(VDF-TrFE) semi-crystalline fluoro-polymer mounted between close-fitting nylon cylinders, and inserted in an extrusion chamber over a smaller diameter end of an expansion mandrel. Co-extrusion occurs when a ram forced the billet over the increasing diameter of the expansion mandrel. In the following examples, the ram rate was 0.25 inches per minute for a product rate of 0.5 inches per minute resulting in a film area increase of 2:1. The compression pressure (force) was 12,000 to 17,000 lb/f t² for an extrusion pressure of 18,000 to 26,000 pounds per square inch. The temperature range was ambient to less than 70° C. The film in the billet is extended both longitudinally and radially as it is forced over the expansion mandrel. Polymer chains in the extruded film are bi-axially oriented in the plane of the film due to the biaxial flow (axial and radial) during extrusion.

Examples 10 and 11

These examples illustrate the use of tooling shown in FIG. 4 to biaxially co-extrude a film two times to achieve a cumulative biaxial area increase of 3.94:1 An as-cast 65/35 p(VDF-TrFE) semi-crystalline fluoro-polymer film was mounted between nylon tubes (i.e., an inner co-extrusion substrate and an outer co-extrusion substrate) to form an extrusion billet. The extrusion billet was fitted over a portion of the expansion mandrel located within an extrusion chamber and compression pressure was applied to a ram in contact with the extrusion billet.

In Example 10, a first co-extrusion expanded the semi-crystalline fluoro-polymer in two directions (axial and radial) to yield an intermediate biaxially oriented film. The area ratio of the Example 10 film to the original semi-crystalline fluoro-polymer sample was 2.27:1.

In Example 11, the Example 10 film was remounted in new nylon cylinders an extruded a second time in the same direction, to produce the Example 11 film. The area ratio of Example 11 to the as-cast original film was 3.94:1.

Example 12 and 13

These examples illustrate double co-extrusion of a double layer of annealed semi-crystalline fluoro-polymer. Two layers of an annealed 65/35 p(VDF-TrFE) semi-crystalline fluoro-polymer were mounted between nylon tubes to form an extrusion billet.

In Example 12, a first co-extrusion expanded the film in two directions to yield an intermediate biaxially oriented semi-crystalline fluoro-polymer film. The area ratio of Example 12 film to the original film was 2.37:1.

In Example 13, the Example 12 film was remounted an extruded a second time in the same direction yielding the Example 13 film. The area ratio of Example 13 to the original un-extruded polymer was 5.5:1. The double layer of doubly extruded film was easily peeled apart from each other and from the nylon. This demonstrates a means of increasing the productivity of co-extrusion.

It is noteworthy that significant biaxial orientation and chain extension was generated in annealed 65/35 p(VDF-TrFE) film by solid state co-extrusion. Annealed films are not generally orientable by tensile drawing because they contain a high degree of large crystallites and as such, they are often too brittle for tensile drawing.

It should be understood, of course, that the foregoing relates to preferred embodiments of the invention and that modifications may be made without departing from the spirit and scope of the invention as set forth in the following claims.

What is claimed is:

1. A method to produce a semi-crystalline fluoro-polymer film comprising the steps of:
    providing a semi-crystalline fluoro-polymer material having an initial surface area; and
    compressing said material at a compression pressure for a period of time sufficient to produce the semi-crystalline fluoro-polymer film having a final film surface area which is greater than the initial surface area of said material and having crystallinity varying from about 50% by weight to 95% by weight, wherein said compression pressure is a pressure greater than 50,000 pounds per square foot; and
    maintaining said material at a compression temperature below the crystal-crystal transition temperature of said material during said step of compressing.

2. The method of claim 1, wherein said semi-crystalline fluoro-polymer film has a thickness of less than 100 micrometers.

3. The method of claim 1, wherein said semi-crystalline fluoro-polymer film has a thickness of greater than 0.1 micrometers.

4. The method of claim 1, wherein a compression ratio equal to said final film surface area divided by said initial surface area of said material is greater than 1.1.

5. The method of claim 1, wherein said step of compressing comprises a plurality of applying cycles wherein each cycle comprises:
    compressing said material at least at a portion of said compression pressure; and
    resting for a period during which compression pressure is not applied to said material.

6. The method of claim 5, wherein a compression pressure of at least one of said plurality of applying cycles is greater than a compression pressure of another of said plurality of applying cycles.

7. The method of claim 1, wherein said material is maintained at a compression temperature above a glass transition temperature of said semi-crystalline fluoro-polymer.

8. The method of claim 1, wherein said material comprises at least one of vinylidene fluoride, trifluoroethylene, tetrafluoroethylene, and hexafluoropropylene.

9. A method to produce a semi-crystalline fluoro-polymer film comprising the steps of:
providing a semi-crystalline fluoro-polymer sample having an initial surface area;
disposing said polymer sample between two layers of at least one co-extrusion substrate;
compressing said polymer sample through said co-extrusion substrates at a compression pressure for a period of time sufficient to produce said semi-crystalline fluoro-polymer film between said layers of said co-extrusion substrate, wherein said semi-crystalline fluoro-polymer film has a final surface area which is greater than the initial surface area of said polymer sample and having crystallinity varying from about 50% by weight to 95% by weight, wherein said compression pressure is a pressure greater than 50,000 pounds per square foot; and
maintaining said polymer sample at a compression temperature below the crystal-crystal transition temperature of said polymer sample during said step of compressing.

10. The method of claim 9, further comprising the step of removing at least one of said layers of said co-extrusion substrate from said semi-crystalline fluoro-polymer film.

11. The method of claim 9, wherein said semi-crystalline fluoro-polymer is ferroelectric, and wherein said crystal-crystal transition temperature is the Curie transition temperature of said semi-crystalline fluoro-polymer.

12. The method of claim 9, wherein said compression temperature is greater than the glass transition temperature of said semi-crystalline fluoro-polymer.

13. The method of claim 9, wherein a compression ratio equal to said final film surface area divided by said initial surface area of said polymer sample is greater than about 1.1.

14. The method of claim 9, wherein said disposing step comprises arranging a plurality of discrete polymer samples each individually between a plurality of layers of said co-extrusion substrate to produce a plurality of alternating layers of said plurality of discrete polymer samples each separated from another by one or more layers of said co-extrusion substrate.

15. A method to produce a semi-crystalline fluoro-polymer film comprising the steps of:
providing a semi-crystalline fluoro-polymer sample having an initial surface area;
disposing said polymer sample between an outer layer of a co-extrusion substrate and an inner layer of a co-extrusion substrate to produce an extrusion billet, wherein said extrusion billet has an initial thickness;
arranging said extrusion billet within an extrusion die, wherein said extrusion die comprises a die inlet in communication with a die outlet, said die inlet having an inlet cross sectional area which is greater than an outlet cross sectional area of said die outlet;
applying a compression pressure against said extrusion billet to force at least a portion of said extrusion billet through said extrusion die from said die inlet to said die outlet such that a final thickness of said extrusion billet is less than said initial thickness of said extrusion billet, to produce said semi-crystalline fluoro-polymer film between said outer layer and said inner layer of said co-extrusion substrate wherein said polymeric film has a final film surface area which is greater than said initial surface area of said polymer sample and having crystallinity varying from about 50% by weight to 95% by weight, wherein said compression pressure is a pressure greater than 50,000 pounds per square foot; and
maintaining said polymer sample at a compression temperature below the crystal-crystal transition temperature of said polymer sample during said step of compressing.

16. The method of claim 15, wherein heat is removed from said extrusion die during said applying of said compression pressure.

17. The method of claim 15, further comprising the step of removing at least one of said layer of said co-extrusion substrate from said semi-crystalline fluoro-polymer film after said extrusion billet exits said die outlet.

18. A method to produce a semi-crystalline fluoro-polymer film comprising the steps of:
providing a semi-crystalline fluoro-polymer sample;
disposing said polymer sample between an outer layer of a co-extrusion substrate and an inner layer of a co-extrusion substrate to produce an extrusion billet having an initial billet surface area;
fitting said inner layer of said extrusion billet radially about an expansion mandrel;
applying a compression pressure against said extrusion billet such that at least a portion of said extrusion billet is forced over said expansion mandrel, such that a final surface area of said extrusion billet is larger than said initial billet surface area, to produce said semi-crystalline fluoro-polymer film between said outer layer and said inner layer of said co-extrusion substrate, wherein said semi-crystalline fluoro-polymer film has a final surface area which is greater than an initial surface area of said polymer sample and having crystallinity varying from about 50% by weight to 95% by weight, wherein said compression pressure is a pressure greater than 50,000 pounds per square foot; and
maintaining said polymer sample at a compression temperature below the crystal-crystal transition temperature of said polymer sample during said step of compressing.

19. The method of claim 18, wherein said outer layer and said inner layer of said co-extrusion substrates comprise concentric cylinders, wherein said outer layer is dimensioned to be radially disposable about at least a portion of said inner layer, and wherein said inner layer is dimensioned to be radially disposable about at least a portion of an expansion mandrel having a frustoconical shape.

20. The method of claim 18, wherein said expansion mandrel is disposed within an extrusion chamber, at least a portion of said expansion mandrel having a mandrel outer wall separated from an inner wall of said extrusion chamber by an extrusion clearance distance, said extrusion chamber and said expansion mandrel being dimensioned and arranged such that during said applying of said compression pressure, at least a portion of said extrusion billet is compressed between said expansion mandrel outer wall and said extrusion chamber inner wall to a thickness equal to said extrusion clearance distance.

21. The method of claim 18, wherein at least one of said inner wall of said extrusion chamber and said outer surface of said expansion mandrel are maintained at a temperature below the melting temperature of said semi-crystalline fluoro-polymer during said applying of said compression pressure.

22. The method of claim 1 wherein:
said provided semi-crystalline fluoro-polymer material has ferroelectric properties; and
the semi-crystalline fluoro-polymer film has ferroelectric properties.

23. The method of claim 9 wherein:
said provided semi-crystalline fluoro-polymer sample has ferroelectric properties; and the semi-crystalline fluoro-polymer film has enhanced ferroelectric properties.

24. The method of claim 15 wherein:
said provided semi-crystalline fluoro-polymer sample has ferroelectric properties; and
the semi-crystalline fluoro-polymer film has enhanced ferroelectric properties.

25. The method of claim 18 wherein:
said provided semi-crystalline fluoro-polymer sample has ferroelectric properties; and
the semi-crystalline fluoro-polymer film has enhanced ferroelectric properties.

* * * * *